United States Patent Office 3,466,700
Patented Sept. 16, 1969

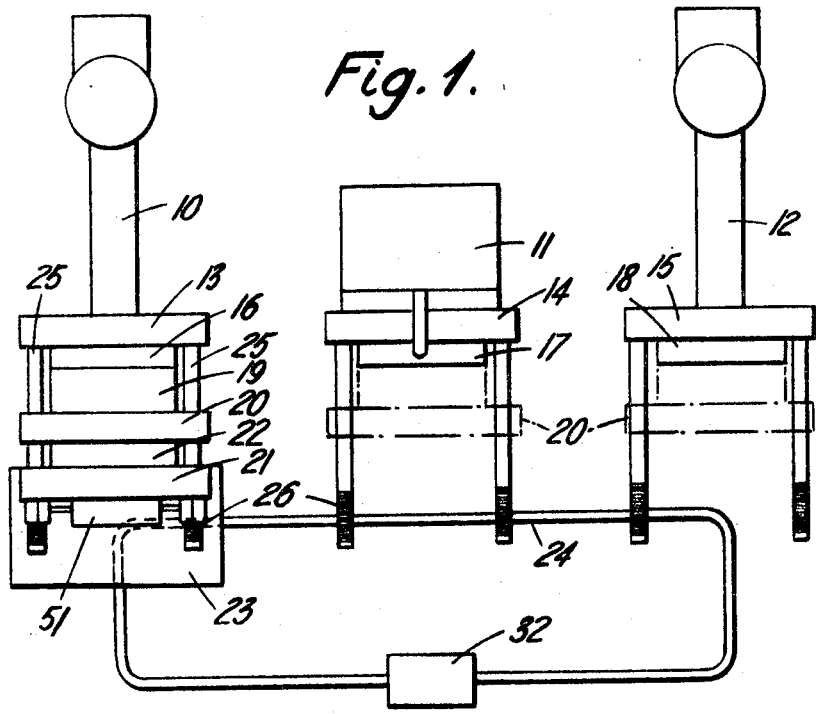

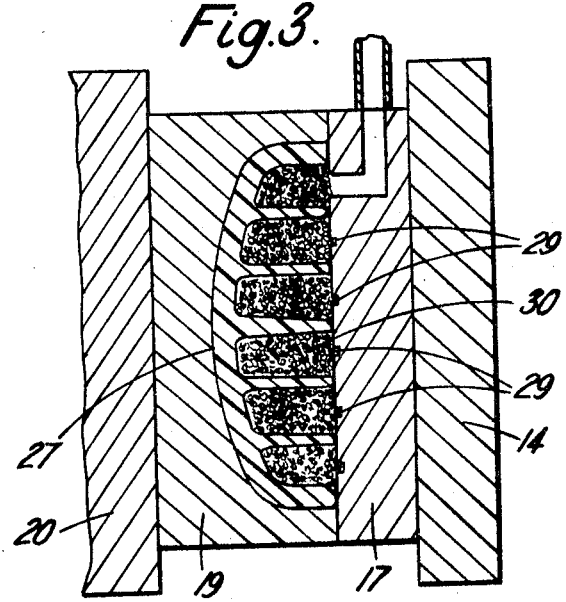
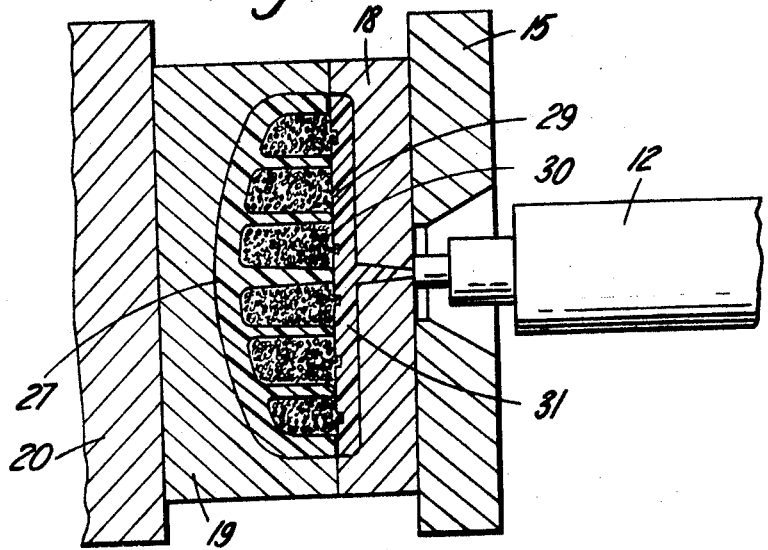

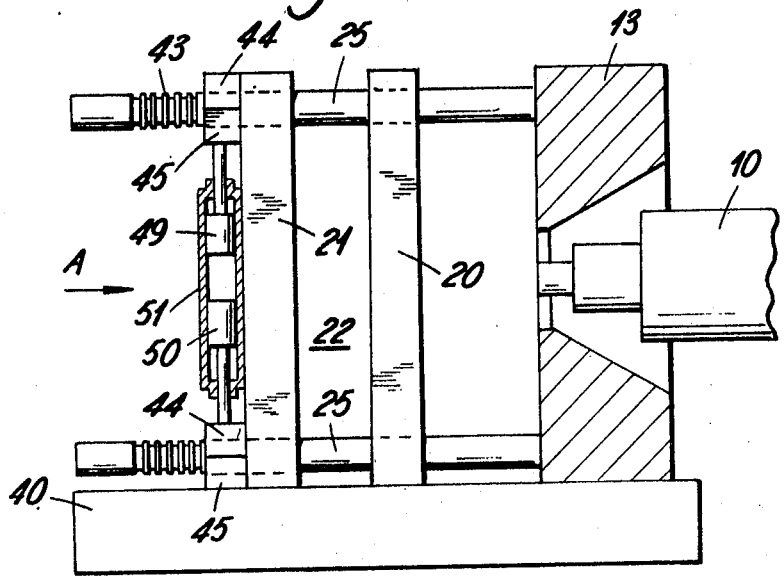
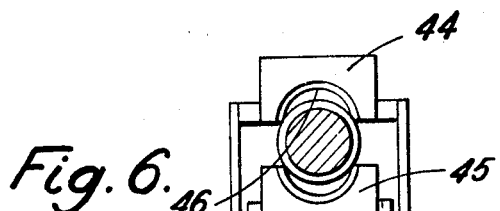

3,466,700
APPARATUS FOR MOLDING MULTILAYER OR COMPOSITE ARTICLES
Peter Franklin Harrison, London, England, assignor to Peco Machinery Limited, London, England, a corporation of Great Britain
Continuation-in-part of application Ser. No. 419,723, Dec. 21, 1964. This application Feb. 3, 1967, Ser. No. 613,810
Claims priority, application Great Britain, Dec. 23, 1963, 50,763/63
Int. Cl. B29c 3/02, 9/00
U.S. Cl. 18—4                              9 Claims

ABSTRACT OF THE DISCLOSURE

Apparatus for molding multilayer or composite articles has a first movable mold section which cooperates in succession with a number of fixed mold sections, the material injected at each stage being carried with the movable mold section to the next fixed mold section. The various fixed mold sections have tie bars with grooves and the movable mold section is carried on a platen linearly movable with respect to a reaction member having locking means for engaging the grooves on the tie bars.

---

This is a continuation-in-part of U.S. application Ser. No. 419,723, filed Dec. 21, 1964 and now abandoned.

This invention relates to apparatus for molding multilayer or composite articles and has a particularly important but not exclusive application in molding articles from plastics.

It is known to mold a multilayer or composite article by filling with molding material a sectional mold having a hollow interior in the shape of part of the article, allowing the material in the mold to set, retaining the molding in position against one of the mold sections whilst replacing the other mold section by a third mold section so formed that when said one and said third mold sections are put together a cavity is formed which is defined in part by said molding and which is in the shape of another part or the remaining part of the article, filling the cavity with molding material, and allowing the material to harden. By this technique, a multilayer or composite article can be formed.

The present invention is directed more particularly to an improved form of apparatus for making such a multilayer or composite article.

More particularly it is an object of the invention to provide an improved form of molding apparatus which is particularly suitable for molding larger composite articles.

According to this invention, apparatus for molding a multilayer or composite article comprises a movable first mold section adapted to co-operate in turn with each of two or more further mold sections to form successively mold cavities into which molding material is injected so that by carrying the already injected material with the first portion, a multilayer article is built up wherein said further mold sections are fixed and each has associated tie bars on which a member carrying the movable mold section can be locked by engagement with peripheral grooves on the tie bars.

Preferably said member carrying the movable mold section is carried on a slide which in turn is carried on a track, the track permitting said movable mold section to be positioned facing any one of the other mold sections and the slide permitting movement of said member carrying the movable mold section to engage the tie-bars. The track conveniently is an endless track. The movable mold section may be mounted on a platen and a piston and cylinder may be provided between the platen and said member for bringing the movable mold section into engagement with a fixed mold section after said member is locked on the tie bars.

The above described apparatus enables an article to be built up in a plurality of layers. The first layer is formed by filling with molding material a sectional mold having a hollow interior in the shape of that layer, allowing the material to set and opening the mold, retaining the layer in position against one of the mold sections. To form the second layer, this mold section is used and the first layer together with another mold section define a cavity in the shape of the next of the layers. This cavity is filled with molding material, which is allowed to set. In each subsequent operation another layer is formed, employing one of the mold sections from the previous operation.

The parts or layers of the article may be located relative to each other by means of ribs and complementary grooves for the ribs, the ribs and grooves being formed on mating surfaces of the parts or layers of the article.

When the article has one layer sandwiched between two other layers, the mold sections may be so shaped that spaced ribs molded integrally with one or other of the said two layers extend right through said one layer.

One embodiment of the invention will now be described by way of example as applied in the manufacture of an article which is of sandwich construction comprising three shaped layers all formed from plastics. The description makes reference to the accompanying diagrammatic drawings in which:

FIGURE 1 shows one form of plant for making the article;

FIGURE 2 shows the formation of the first layer between the first and second mold sections;

FIGURE 3 shows the formation of the second layer between the first and third mold sections;

FIGURE 4 shows the formation of the third layer between the first and fourth mold sections;

FIGURE 5 is a side elevation of part of the plant of FIGURE 1, illustrating a releasable locking mechanism; and FIGURE 6 shows diagrammatically the arrangement of the releasable locking mechanism of FIGURE 5, viewed in the direction of the arrow A.

Referring to FIGURE 1, there is illustrated an apparatus for molding plastic articles in which each article is formed of a number of successive layers.

The layers are built up one upon the other. The first layer of the article is molded in a split mold comprising first and second sections which when put together define between them a mold cavity in the shape of the first layer. Thermoplastic material in a plastic condition is injected into the mold cavity from an injection molding machine and after the plastic has set the mold is opened. The first and second mold sections are so shaped in relation to each other that when the mold sections are parted this layer of the article adheres in its position on the first mold section but when necessary can be detached therefrom. The second mold section is shaped to form locating ribs on the surface of the first layer for a purpose to be described presently. The first mold section with the attached layer of the article is then used in conjunction with a third mold section which is shaped to form the second layer of the article. The first layer is of course disposed between the two mold sections and defines part of the new mold cavity. Expandable plastic is now injected into the cavity, is expanded and is allowed to set, and the mold is then opened. The first layer of the article still remains attached to the first mold section, and the ribs on the first layer and complementary grooves which are formed by the ribs as the second layer is molded ensure that the second layer is located and held by the first layer. Similar locating grooves are formed by the third mold section on the surface of the expanded plastic.

The first mold section with the two layers attached to it is then used in conjunction with a fourth mold section which, with the outer surface of the second layer, defines the third layer of the article, and thermoplastic material in a plastic condition is injected into the mold cavity thus defined. The grooves on the second layer cause the formation of complementary ribs on the third layer to locate and hold the third layer on the second layer.

The plant shown in FIGURE 1 comprises two screw-type injection molding machines 10, 12 disposed one on each side of a filler 11 for filling a mold with expanded plastics materials, one machine for each layer. Each of the injection molding machines 10, 12 has a nozzle, the nozzle being surrounded by respective fixed platens 13, 15 and the filler also has a fixed platen 14. The three fixed platens 13, 14, 15 respectively have fixed to them the second, third, and fourth mold sections 16, 17, 18. The first mold section 19 is carried on a platen 20, and platen 20 is in turn carried on a reaction member 21. The reaction member and the movable platen are connected together by a piston-and-cylinder motor 22 in a manner enabling the platen 20 to be moved towards and away from the reaction member 21. The reaction member is carried on a slide 23 which is in turn mounted on an endless track 24 extending transversely of the molding machines 10, 11, 12 so that the first mold section 19 can be brought into a position facing any of the fixed mold sections 16, 17 and 18. Tie bars 25 project from each of the fixed platens 13, 14, 15 towards the track 24 and the reaction member 21 when aligned with any of the three fixed platens can be moved on its slide 23 into engagement with the tie bars and can be locked in a selected position on peripheral grooves 26 on the tie bars so that the movable platen and the first mold section can then be moved by motor 22 into engagement with the mold section 16, 17 or 18 carried by the appropriate fixed platen.

The locking means for engaging the tie bars are illustrated in FIGURES 5 and 6. FIGURE 5 shows the nozzle 10 surrounded by the fixed platen 13 and the movable platen 20. For clarity, in FIGURE 5, the mold sections are omitted. The mechanism is mounted on a bed 40. Four tie bars 25 of circular cross-section extend from the fixed platen 13 through the movable platen and through the reaction member 21. The tie bars serve as a guide for the movable platen 20 and reaction member 21 as they are moved towards and away from the fixed platen 13, but the weight of the platen 20 and member 21 is carried on the machined horizontal top surface 25 of the bed 40.

The tie bars 25 also extend slidingly through bushes disposed in the four corners of the reaction member 21 which is in the form of a stout rectangular plate and which is arranged parallel to the platen 20.

Releasable locking means are provided for locking the reaction member 21 to the tie bars at various positions along the length of the bars. For this purpose, the tie bars are each formed, over part of their length, with a series of peripheral grooves 43 and the grooved parts of the respective bars are disposed opposite each other. The grooves on each tie bar are engageable by the two halves 44, 45 (FIGURE 6) of a split hollow boss mounted on reaction member 21, the two halves being disposed one above and the other below the tie bar and the internal surfaces of the boss halves being formed with peripheral ribs 46 which are complementary to the grooves in the tie bar. The two halves of each boss can be brought together to grip the associated tie bar and thus to lock the reaction member 21 against axial movement towards or away from fixed platen 13, and can be released to permit said axial movement.

For their operation, the two split bosses to each side of the vertical plane of symmetry of the mechanism are paired with each other in the manner shown in FIGURE 6 and are operated by an actuator. As shown, the two upper boss halves 44 of the pair of bosses are coupled together in tandem by rods 47 and the two lower halves are similarly coupled together by rods 48. The lower half 45 of the upper boss and the upper half 44 of the lower boss are respectively secured to the piston rods of two opposed pistons 49, 50 which are slidable in an upright cylinder 51 secured to the rear face of reaction member 21. Hydraulic fluid under pressure can be supplied through conduits (not shown) to the cylinder space 48 between the pistons or to the two ends 49 of the cylinder space to close or open the bosses.

The locking grooves are provided over a sufficient part of the length of the tie bars to permit the bosses to be clamped on to the grooved parts at various positions along the lengths of the bars, so that molds having different heights, i.e. requiring different spacings of the platens, can be used with the mechanism.

In use of this plant the reaction member 21 and the movable platen 20 carrying the first mold section 19 are brought into alignment with the first injection molding machine 10, i.e. the machine carrying the second mold section 16. The mold sections 19, 16 are pressed together by motor 22 and plastic is injected into the mold cavity as shown in FIGURE 2. In this construction of the molds, the second mold section 16 is shaped to form deep ribs 28 on the surface of this first layer 27 of the article. After a cooling period the movable platen 20 is operated by motor 22 to open the mold. This motor is a hydraulic piston and cylinder located between the reaction member 21 and the movable platen 20.

The reaction member 21 is then moved rearwards on the slide out of engagement with the tie bars on the first machine and transversely along the track into alignment with the second molding machine 11, which carries the third mold section 17. The first mold section 19 with the attcahed first layer 27 is moved into engagement with the third mold section 17 as shown in FIGURE 3 and the second layer 30 is molded from expanded plastics material. Ribs 28 extend to the surface of mold section 17 but the molding material flows through interruptions in the ribs to fill the mold. The third mold section 17 is shaped to form locating ribs 29 on the surface of the second layer. Subsequently the reaction member 21 is moved to bring the first mold section and the two attached layers 27, 30 of the article into alignment with the fourth mold section 18 on the third machine 12, and the third layer 31 is formed by injection molding. When the reaction member leaves the three injection molding machines the completed article is ejected from the first mold section at an ejection station 32 and the unit comprising the reaction member, platen 20 and first mold section 19 is returned to the first injection molding machine.

In another arrangement, not illustrated, the slide 23 is disposed on a rotary table instead of an endless track, and the machines 10, 11, 12 and the ejection station are disposed round the table.

In the arrangement described above the layers interlock with each other by means of ribs 28, 29, but it may be arranged that the layers adhere to each other.

I claim:

1. Apparatus for molding a multilayer or composite article comprising a movable first mold section adapted to co-operate in turn with each of at least two further mold sections to form successively larger mold cavities, into which molding material is injected to build up a multilayer article, wherein the improvement consists in that said further mold sections are fixed and in that each has associated tie bars with peripheral grooves and in that the first mold section is carried on a member adapted to engage said peripheral grooves on the tie bars thereby to be locked on the tie bars with the movable mold section held in co-operative relationship with a fixed mold section.

2. Apparatus as claimed in claim 1 wherein there are provided a track and a slide carried by said track and wherein said member carrying the movable mold section is carried on said slide, the track being arranged to permit said movable mold section to be positioned facing any one of the other mold sections in turn and the slide being arranged to permit movement of said member carrying the movable mold section transversely to the track to engage the tie bars.

3. Apparatus as claimed in claim 2 wherein said track is an endless track.

4. Apparatus as claimed in claim 1 wherein there is provided a platen on which said movable mold section is movably mounted wherein piston and cylinder is provided between said platen and said member for bringing the movable mold section into engagement with a fixed mold section after said member is locked on the tie bars.

5. Apparatus as claimed in claim 1 and having injection means for injecting plastic material associated with each of the fixed mold sections for injecting plastic material.

6. Apparatus as claimed in claim 5 wherein one of said injection means is arranged to inject an expanded plastic into the mold cavity.

7. Apparatus as claimed in claim 1 and having at least three fixed mold sections, the mold sections being shaped to produce an article having one layer sandwiched between two other layers, spaced ribs formed integrally with one or other of said two other layers extending right through said one layer.

8. Apparatus for molding a multilayer article comprising a number of fixed mold sections, each having associated tie bars with peripheral grooves, an endless track, a member movable along said track, a movable mold section carried by said member, said track being arranged so that the movable mold section can be positioned successively to co-operate with each of the fixed mold sections to define successively larger mold cavities, means for locking said member in engagement with the peripheral grooves of said tie bars when the movable mold section is positioned in co-operative relationship with each fixed mold section and means for injecting plastic material into each mold formed by positioning the movable mold section against each of the fixed mold sections in succession.

9. Apparatus as claimed in claim 8 wherein there is provided a platen on which said movable mold section is movably mounted and wherein a piston and cylinder is provided between the movable mold section and said member for bringing the movable mold section into engagement with a fixed mold section.

References Cited

UNITED STATES PATENTS

| | | | |
|---|---|---|---|
| 2,442,607 | 6/1948 | Leguillon et al. | 18—30 |
| 3,173,176 | 3/1965 | Kobayashi | 18—30 |
| 3,244,783 | 4/1966 | Eissfeldt et al. | 18—5 X |
| 3,314,112 | 4/1967 | Hardcastle | 18—30 |
| 3,389,198 | 6/1968 | Taber | 18—5 X |

FOREIGN PATENTS

| | | |
|---|---|---|
| 1,072,799 | 1/1960 | Germany. |
| 1,210,141 | 2/1966 | Germany. |
| 1,299,327 | 6/1962 | France. |

WILBUR L. McBAY, Primary Examiner

U.S. Cl. X.R.

18—30, 43; 264—45, 279, 328